(12) United States Patent
Asakura

(10) Patent No.: US 8,960,030 B2
(45) Date of Patent: Feb. 24, 2015

(54) STEERING LOCK DEVICE

(75) Inventor: Masahiko Asakura, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 144 days.

(21) Appl. No.: 12/991,536

(22) PCT Filed: May 7, 2009

(86) PCT No.: PCT/JP2009/058627
§ 371 (c)(1),
(2), (4) Date: Nov. 8, 2010

(87) PCT Pub. No.: WO2009/147919
PCT Pub. Date: Dec. 10, 2009

(65) Prior Publication Data
US 2011/0061483 A1    Mar. 17, 2011

(30) Foreign Application Priority Data

Jun. 6, 2008   (JP) .................................. 2008-149740
Jun. 6, 2008   (JP) .................................. 2008-149741

(51) Int. Cl.
| | | |
|---|---|---|
| F16H 25/08 | (2006.01) | |
| B60R 25/02 | (2013.01) | |
| F16D 63/00 | (2006.01) | |
| F16D 121/24 | (2012.01) | |

(Continued)

(52) U.S. Cl.
CPC ............. *F16D 63/006* (2013.01); *B60R 25/02* (2013.01); *F16D 2121/24* (2013.01); *F16D 2121/26* (2013.01); *F16D 2125/32* (2013.01)
USPC ....................... 74/57; 74/567; 70/184; 70/252

(58) Field of Classification Search
USPC .............. 74/89.25, 493, 540, 25, 56, 57, 425, 74/567, 99 R; 70/181, 182, 183, 184, 185, 70/186, 252
See application file for complete search history.

(56) References Cited

U.S. PATENT DOCUMENTS 3,914,967 A * 10/1975 Arman ............................ 70/252
4,798,067 A * 1/1989 Peitsmeier et al. ............. 70/252

(Continued)

FOREIGN PATENT DOCUMENTS

| JP | 2005-343378 A | 12/2005 | |
|---|---|---|---|
| JP | 2008-114786 A | 5/2008 | |
| JP | 2008114786 A | * 5/2008 | |

*Primary Examiner* — William Kelleher
*Assistant Examiner* — Emily Cheng
(74) *Attorney, Agent, or Firm* — Mori & Ward, LLP

(57) ABSTRACT

An actuator (A) of a steering lock device includes a tubular member (17) that is fitted around an outer periphery of a lock pin (14) and is rotated by an electric motor (19), a helical cam groove (14e) is provided, among an inner peripheral face of the tubular member (17) and an outer peripheral face of the lock pin (14), in the outer peripheral face of the lock pin (14), a ball (21) is disposed between the cam groove (14e) and a ball retaining groove (17a, 17a) of the tubular member (17), and a guide pin (23) implanted in the lock pin (14) opposes a cam face (17d) formed on the inner peripheral face of the tubular member (17). Even when a bottom part of the ball retaining groove (17a, 17a) is worn and the lock pin (14) cannot be pulled out from a recess (12a) by the cam groove (14e), the lock pin (14) can be pulled out completely from the recess (12a) by the cam face (17d) and the guide pin (23) and, moreover, since the cam groove (14e) and the cam face (17d) are provided so as to be divided between the tubular member (17) and the lock pin (14), it is possible to achieve a reduction in the size of the actuator (A).

14 Claims, 8 Drawing Sheets

(51) Int. Cl.
*F16D 121/26* (2012.01)
*F16D 125/32* (2012.01)

(56) References Cited

U.S. PATENT DOCUMENTS

| | | | |
|---|---|---|---|
| 6,357,807 B1* | 3/2002 | Fan | 292/226 |
| 6,539,756 B2* | 4/2003 | Bartels et al. | 70/186 |
| 7,810,363 B2* | 10/2010 | Okada et al. | 70/186 |
| 7,856,858 B2* | 12/2010 | Laval et al. | 70/186 |
| 7,975,516 B2* | 7/2011 | Okada et al. | 70/186 |
| 2002/0108412 A1* | 8/2002 | Starken | 70/275 |
| 2003/0024338 A1* | 2/2003 | Roither et al. | 74/425 |
| 2006/0053921 A1* | 3/2006 | Kawamura et al. | 74/425 |
| 2006/0169011 A1* | 8/2006 | Limburg | 70/186 |
| 2007/0113604 A1* | 5/2007 | Khoury et al. | 70/186 |
| 2011/0061483 A1* | 3/2011 | Asakura | 74/89.25 |

* cited by examiner

DEVELOPED VIEW OF INNER FACE OF CYLINDRICAL MEMBER

UNLOCKED STATE (WHEN WORN)

FIG.8
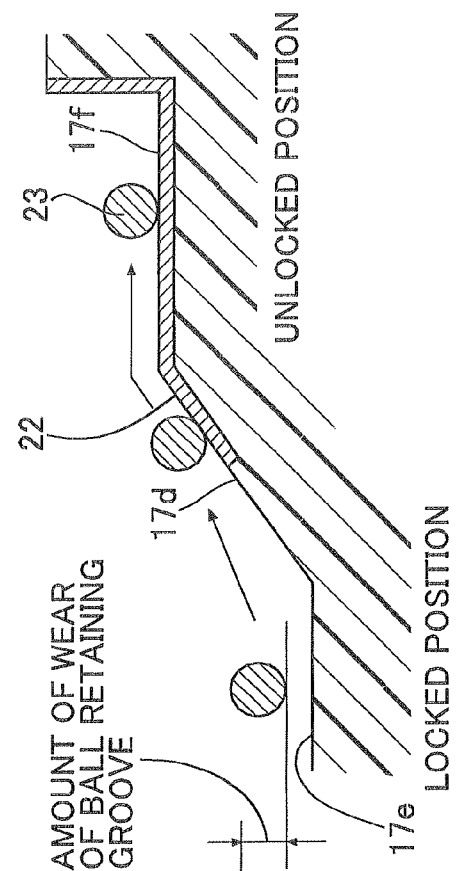
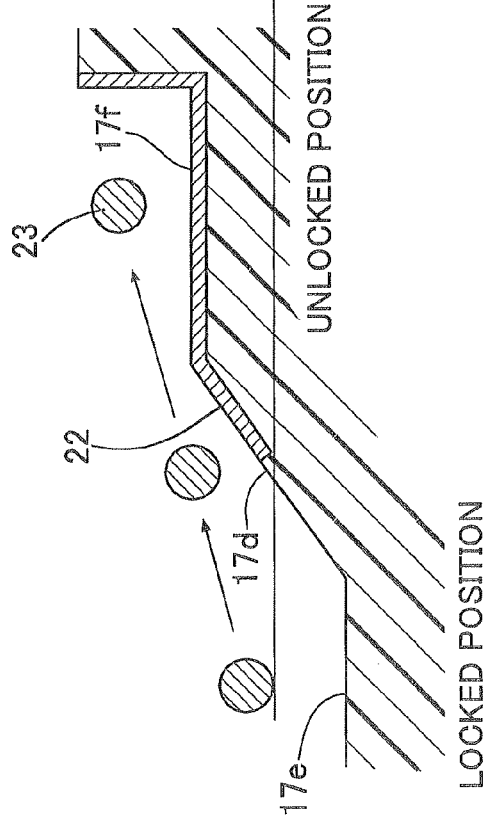

STEERING LOCK DEVICE

CROSS-REFERENCED TO RELATED APPLICATION

This application is a National Stage entry of International Application No. PCT/JP2009/058627, filed May 7, 2009, which claims priority to Japanese Patent Application 2008-149740, filed Jun. 6, 2008 and Japanese Patent Application 2008-149741, filed Jun. 6, 2008. The disclosures of the prior applications are hereby incorporated in their entirety by reference.

TECHNICAL FIELD

The present invention relates to a steering lock device that non-rotatably locks a steering shaft by engaging the extremity of a lock pin that is moved back and forth by an actuator with a recess formed in the outer periphery of the steering shaft.

BACKGROUND ART

An arrangement in which a ball (cam follower) is disposed between a helical cam groove formed in an outer peripheral face of a lock pin (lock bolt) that can engage with an engagement recess of a steering shaft and a longitudinal groove formed in an inner peripheral face of a cylindrical rotating body fitted rotatably around the outer periphery of the lock pin, and the lock pin is made to move back and forth by rotating the rotating body back and forth by an electric motor to thus lock and unlock rotation of the steering shaft is known from Patent Document 1 below.
[Patent Document 1] Japanese Patent Application Laid-open No. 2005-343378

DISCLOSURE OF INVENTION

Problems to be Solved by the Invention

In the above-mentioned conventional arrangement, if an attempt is made to pull out the lock pin by rotating the rotating body by means of the electric motor in a state in which the lock pin is strongly biting into the engagement recess of the steering shaft, there is a possibility that a bottom part of the longitudinal groove of the rotating body will be strongly pressed against the ball and worn so as to form an indentation. If the bottom part of the longitudinal groove of the rotating body is worn in this way, even when the lock pin is pulled up in order to unlock the steering shaft, the amount by which the lock pin is pulled up is reduced by an amount corresponding to the amount of wear of the bottom part of the longitudinal groove, and there is a possibility that unlocking will become impossible. In order to avoid this, the length of the helical cam groove of the lock pin may be made longer so as to increase the movable stroke, but by so doing the lock pin becomes longer, and there is the problem that the size of the steering lock device increases.

The present invention has been accomplished in the light of the above-mentioned circumstances, and it is an object thereof to reliably carry out unlocking by an actuator of a steering lock device.

Means for Solving the Problems

In order to attain the above object, according to a first aspect of the present invention, there is provided a steering lock device that non-rotatably locks a steering shaft by engaging an extremity of a lock pin with a recess formed in an outer periphery of the steering shaft, the lock pin being moved back and forth by an actuator, the actuator comprising an electric motor, a tubular member that is fitted around an outer periphery of the lock pin and is rotated by the electric motor, and cam means that is provided on one of an inner peripheral face of the tubular member and an outer peripheral face of the lock pin and converts rotation of the tubular member into back and forth movement of the lock pin in the axial direction, characterized in that auxiliary cam means is provided on the other of the inner peripheral face of the tubular member and the outer peripheral face of the lock pin, the auxiliary cam means converting rotation of the tubular member into movement in a direction that pulls out the lock pin from the recess.

Further, according to a second aspect of the present invention, in addition to the first aspect, the auxiliary cam means operates after the lock pin is pulled out from the recess by the cam means.

Furthermore, according to a third aspect of the present invention, there is provided a steering lock device that non-rotatably locks a steering shaft by engaging an extremity of a lock pin with a recess formed in an outer periphery of the steering shaft, the lock pin being moved back and forth by an actuator, the actuator comprising an electric motor, a rotating member that is fitted around an outer periphery of the lock pin and is rotated by the electric motor, and cam means that converts rotation of the rotating member into back and forth movement of the lock pin in the axial direction, characterized in that it comprises auxiliary cam means that, when the stroke of the lock pin due to the cam means is insufficient to disengage the extremity of the lock pin from the recess, converts rotation of the rotating member into movement of the lock pin in the axial direction to increase the stroke of the lock pin.

Further, according to a fourth aspect of the present invention, in addition to the third aspect, the rotating member is formed into a tubular shape, the cam means is provided on one of an inner peripheral face of the rotating member and an outer peripheral face of the lock pin, and the auxiliary cam means is provided on the other of the inner peripheral face of the rotating member and the outer peripheral face of the lock pin.

Furthermore, according to a fifth aspect of the present invention, in addition to the third or fourth aspect, the auxiliary cam means operates after the lock pin is pulled out from the recess by the cam means.

A cam groove 14e of an embodiment corresponds to the cam means of the present invention, a tubular member 17 of the embodiment corresponds to the rotating member of the present invention, and a cam face 17d of the embodiment corresponds to the auxiliary cam means of the present invention.

EFFECTS OF THE INVENTION

In accordance with the first aspect of the present invention, moving the lock pin forward by means of the actuator and engaging the extremity thereof with the recess formed in the outer periphery of the steering shaft enables the steering shaft to be locked so that it cannot rotate, and conversely moving the lock pin backward by means of the actuator and disengaging the extremity thereof from the recess formed in the outer periphery of the steering shaft enables locking of the steering shaft to be released.

Since the actuator includes the tubular member, which is fitted around the outer periphery of the lock pin and is rotated by means of the electric motor, the cam means, which converts rotation of the tubular member into back and forth movement in the axial direction of the lock pin, is provided on one of the inner peripheral face of the tubular member and the outer peripheral face of the lock pin, and the auxiliary cam means, which pulls out the lock pin from the recess by virtue of rotation of the tubular member, is provided on the other, even if the lock pin cannot be pulled out from the recess by the cam means, the lock pin can reliably be pulled out from the recess by the auxiliary cam means and, moreover, providing the cam means and the auxiliary cam means so as to be divided between the tubular member and the lock pin enables the size of the actuator to be reduced.

Furthermore, in accordance with the second aspect of the present invention, since the auxiliary cam means operates after the lock pin is pulled out from the recess by the cam means, not only can the size of the auxiliary cam means be reduced, but also increase in the load of the actuator due to the auxiliary cam means being operated can be minimized.

Moreover, in accordance with the third aspect of the present invention, moving the lock pin forward by means of the actuator and engaging the extremity thereof with the recess formed in the outer periphery of the steering shaft enables the steering shaft to be locked so that it cannot rotate, and conversely moving the lock pin backward by means of the actuator and disengaging the extremity thereof from the recess formed in the outer periphery of the steering shaft enables locking of the steering shaft to be released.

The actuator includes the rotating member, which is fitted around the outer periphery of the lock pin and is rotated by the electric motor, and the cam means converts rotation of the rotating member into back and forth movement in the axial direction of the lock pin to thus pull out the lock pin from the recess; when the stroke of the lock pin is insufficient and it cannot be pulled out from the recess, the auxiliary cam means increases the stroke of the lock pin, thus reliably pulling it out from the recess and thereby improving the reliability of release of locking.

Furthermore, in accordance with the fourth aspect of the present invention, since the cam means is provided on one of the inner peripheral face of the tubular rotating member and the outer peripheral face of the lock pin and the auxiliary cam means is provided on the other thereof, compared with a case in which both the cam means and the auxiliary cam means are provided on the rotating member side or the lock pin side, the size of the actuator can be made smaller.

Moreover, in accordance with the fifth aspect of the present invention, since the auxiliary cam means operates after the lock pin is pulled out from the recess by the cam means, not only can the size of the auxiliary cam means be reduced, but also increase in the load of the actuator due to the auxiliary cam means being operated can be minimized.

BRIEF DESCRIPTION OF DRAWINGS

FIG. 8 is a diagram for explaining the operation of a cam face and a guide pin. (first embodiment)

EXPLANATION OF REFERENCE NUMERALS AND SYMBOLS

Figure 1:
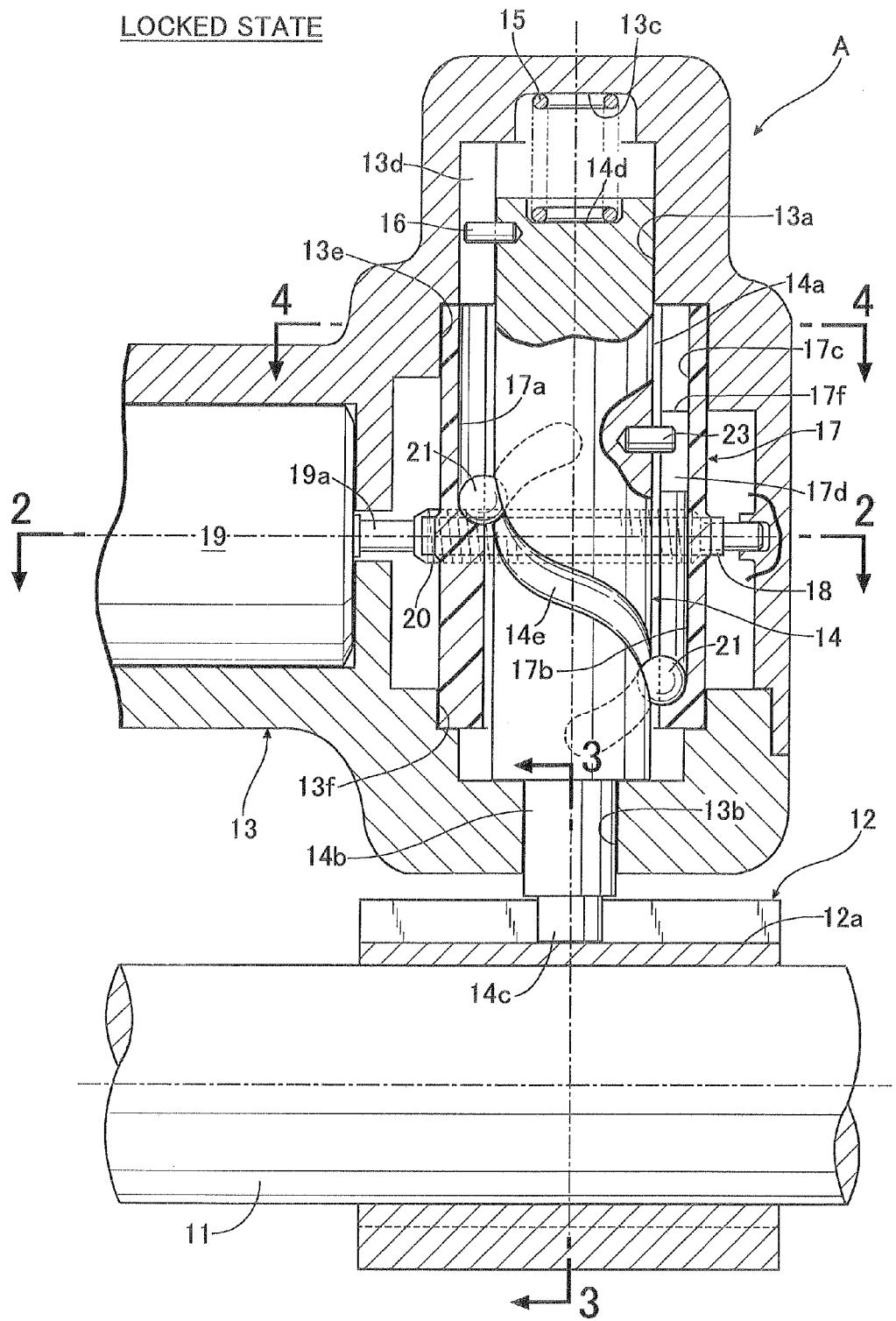
FIG. 1 is a vertical sectional view (locked state) of a steering lock device. (first embodiment)
Figure 2:
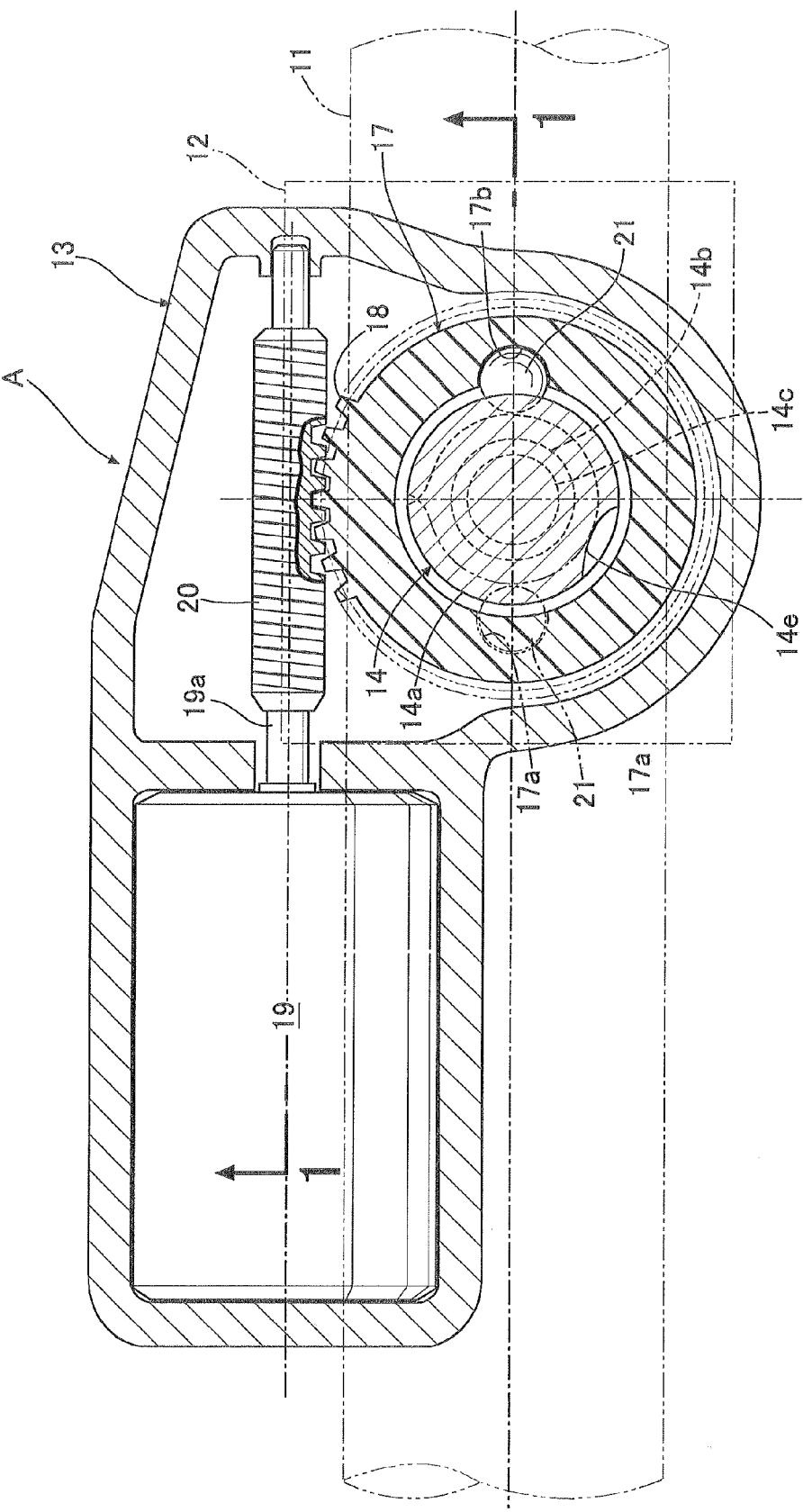
FIG. 2 is a sectional view along line 2-2 in FIG. 1. (first embodiment)
Figure 3:
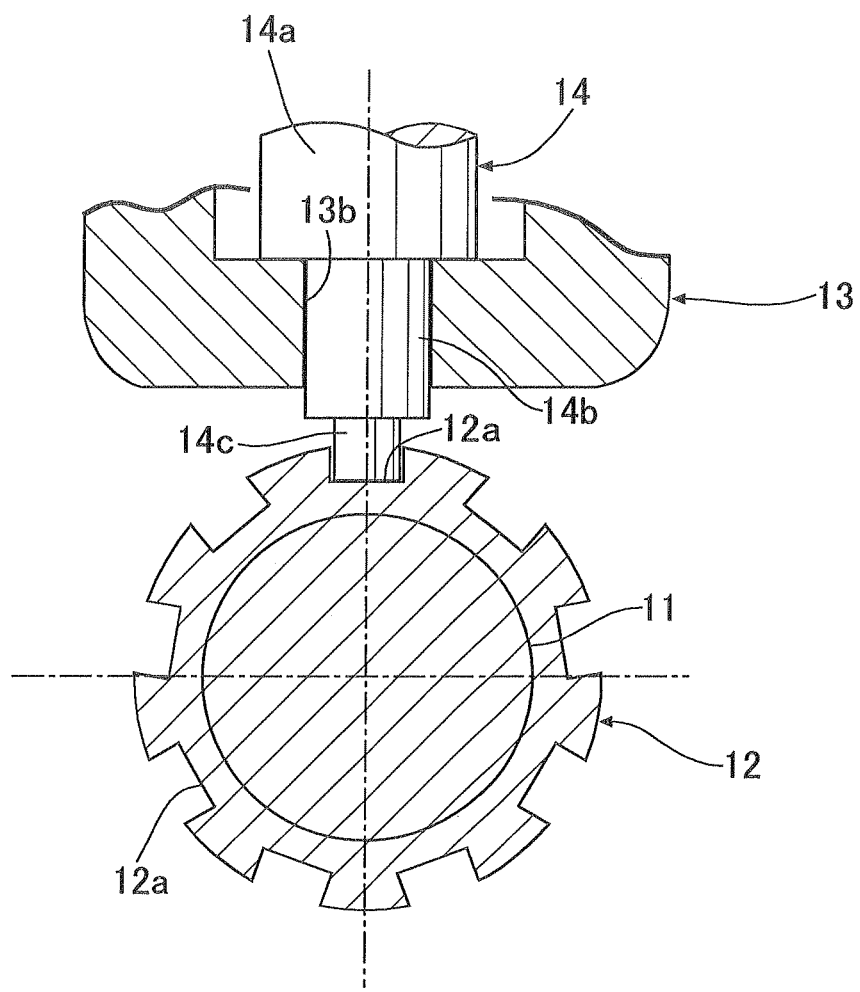
FIG. 3 is a sectional view along line 3-3 in FIG. 1. (first embodiment)

A Actuator
11 Steering shaft
12a Recess
14 Lock pin
14e Cam groove (cam means)
17 Tubular member (rotating member)
17d Cam face (auxiliary cam means)
19 Electric motor

BEST MODE FOR CARRYING OUT THE INVENTION

A mode for carrying out the present invention is explained below by reference to the attached drawings.

First Embodiment

FIG. 1 to FIG. 8 show a mode for carrying out the present invention.

As shown in FIG. 1 to FIG. 4, a plurality (nine in the embodiment) of axially extending groove-shaped recesses 12a are formed in the outer periphery of a collar 12 fixed to the outer periphery of a steering shaft 11 connected to a steering wheel, which is not illustrated.

An actuator A fixed to the vehicle body side includes an actuator housing 13, and a circular cross section lock pin 14 is housed in the interior thereof in a state in which the axis of the lock pin 14 is perpendicular to the axis of the steering shaft 11, the lock pin 14 having a large diameter portion 14a, a small diameter portion 14b, and an engagement portion 14c. An upper part of the large diameter portion 14a of the lock pin 14 is slidably fitted into a guide hole 13a on the upper side of the actuator housing 13, the small diameter portion 14ba of the lock pin 14 is slidably fitted into a guide hole 13b on the lower side of the actuator housing 13, and the engagement portion 14c of the lock pin 14 projects downward from the actuator housing 13 so that it can engage with the recesses 12a of the collar 12.

A coil spring 15 is provided in a compressed state between a spring seat 14d provided on an upper end face of the large diameter portion 14a of the lock pin 14 and a spring seat 13c provided on an inner face of the actuator housing 13, and the resilient force of the coil spring 15 urges the lock pin 14 in a direction in which it projects downward from the actuator housing 13. A detent pin 16 implanted in an upper part of the lock pin 14 is slidably fitted in a detent groove 13d formed in the actuator housing 13 along the axial direction of the lock pin 14. The lock pin 14 can thereby move back and forth in the axial direction without rotating.

A tubular member 17 formed into a cylindrical shape from a synthetic resin is fitted around the outer periphery of the large diameter portion 14a of the lock pin 14, and is rotatably supported by guide faces 13e and 13f of the actuator housing 13. A worm wheel 18 formed integrally with the outer periphery of the tubular member 17 meshes with a worm 20 provided on an output shaft 19a of an electric motor 19 housed in the interior of the actuator housing 13. Therefore, when the electric motor 19 is driven forward or backward, the tubular member 17 is rotated forward or backward via the worm 20 and the worm wheel 19.

A helical cam groove 14e is formed in an outer peripheral face of the lock pin 14 over approximately 360°, and two ball retaining grooves 17a and 17b are formed in an inner peripheral face of the tubular member 17 along the axial direction with a phase shift of 180°, the ball retaining grooves 17a and 17b retaining two balls 21 and 21 in cooperation with the cam groove 14e. Upper ends of the ball retaining grooves 17a and 17b open at the upper end of the tubular member 17, the lower end of one ball retaining groove 17a being high and the lower end of the other ball retaining groove 17a being low so as to match the helical cam groove 14e.

Figure 4:
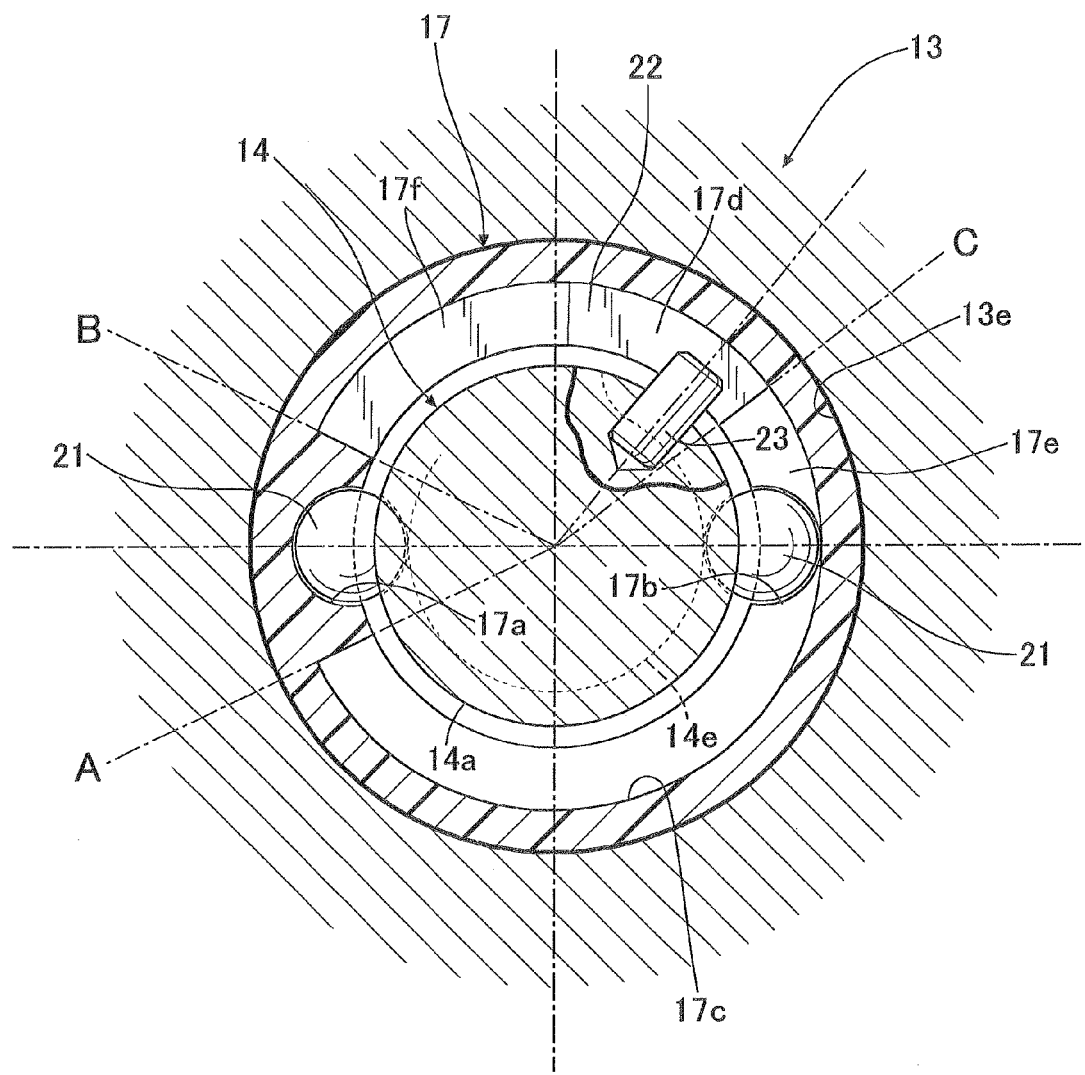
FIG. 4 is a sectional view along line 4-4 in FIG. 1. (first embodiment)
Figure 5:
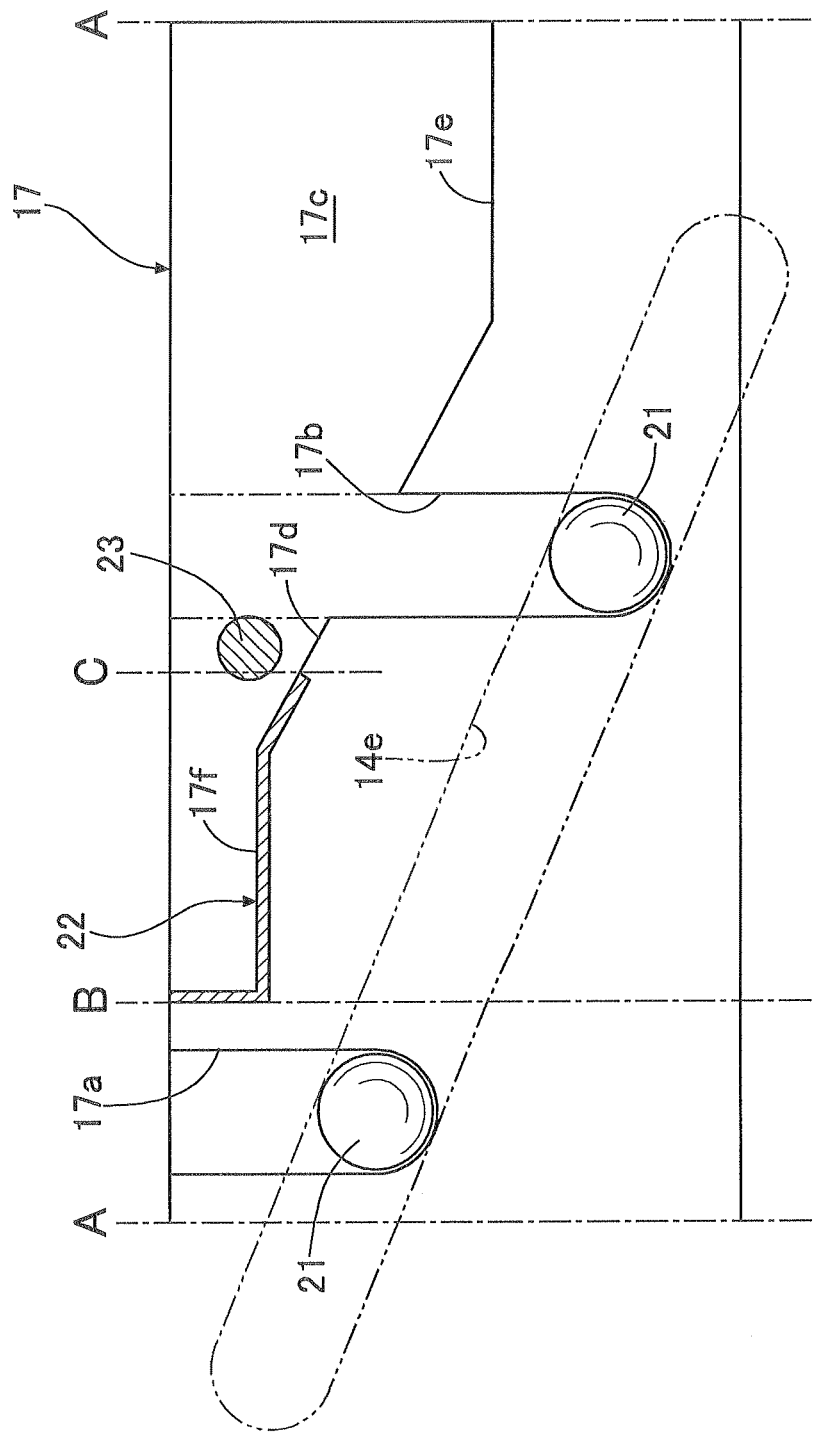
FIG. 5 is a developed view of an inner peripheral face of a tubular member. (first embodiment)

As is clear from FIG. 1, FIG. 4, and FIG. 5, a recess 17c is formed in an inner peripheral face of an upper part of the tubular member 17 over less than one revolution so that it partially intersects with the longer ball retaining groove 17b and opens at the upper end of the tubular member 17, this recess 17c having formed at the lower edge a helical cam face 17d and flat faces 17e and 17f on opposite sides, in the peripheral direction, of the cam face 17d. A liner 22 formed from a metal sheet for preventing wear is embedded in part of the upper side of the cam face 17d and the flat face 17f on the upper side. On the other hand, a guide pin 23 that can abut against the cam face 17d and the flat face 17f on the upper side is implanted in the outer periphery of the lock pin 14. Four lines A, B, C, and D showing phases in FIG. 4 correspond to lines A, B, C, and D in the developed view of FIG. 5.

The operation of the mode for carrying out the present invention having the above-mentioned arrangement is now explained.

FIG. 1 shows a locked state of the steering shaft 11; the engagement portion 14c at the lower end of the lock pin 14 projecting downward from the actuator housing 13 engages with any one of the recesses 12a of the collar 12 of the steering shaft 11, thus locking the steering shaft 11 so that it cannot rotate. In this locked state, if the two balls 21 and 21 engaging with the cam groove 14e move upward within the two ball retaining grooves 17a and 17b of the tubular member 17, the detent pin 16 moves upward within the detent groove 13d of the tubular member 17, and the guide pin 23 moves upward within the recess 17c of the tubular member 17, there is a possibility that the engagement portion 14c of the lock pin 14 would disengage upward from the recess 12a, but in reality the resilient force of the coil spring 15 pushes down the lock pin 14 to a position in which the balls 21 and 21 abut against bottom parts of the ball retaining grooves 17a and 17b, thereby preventing the engagement portion 14c from disengaging from the recess 17c.

Figure 6:
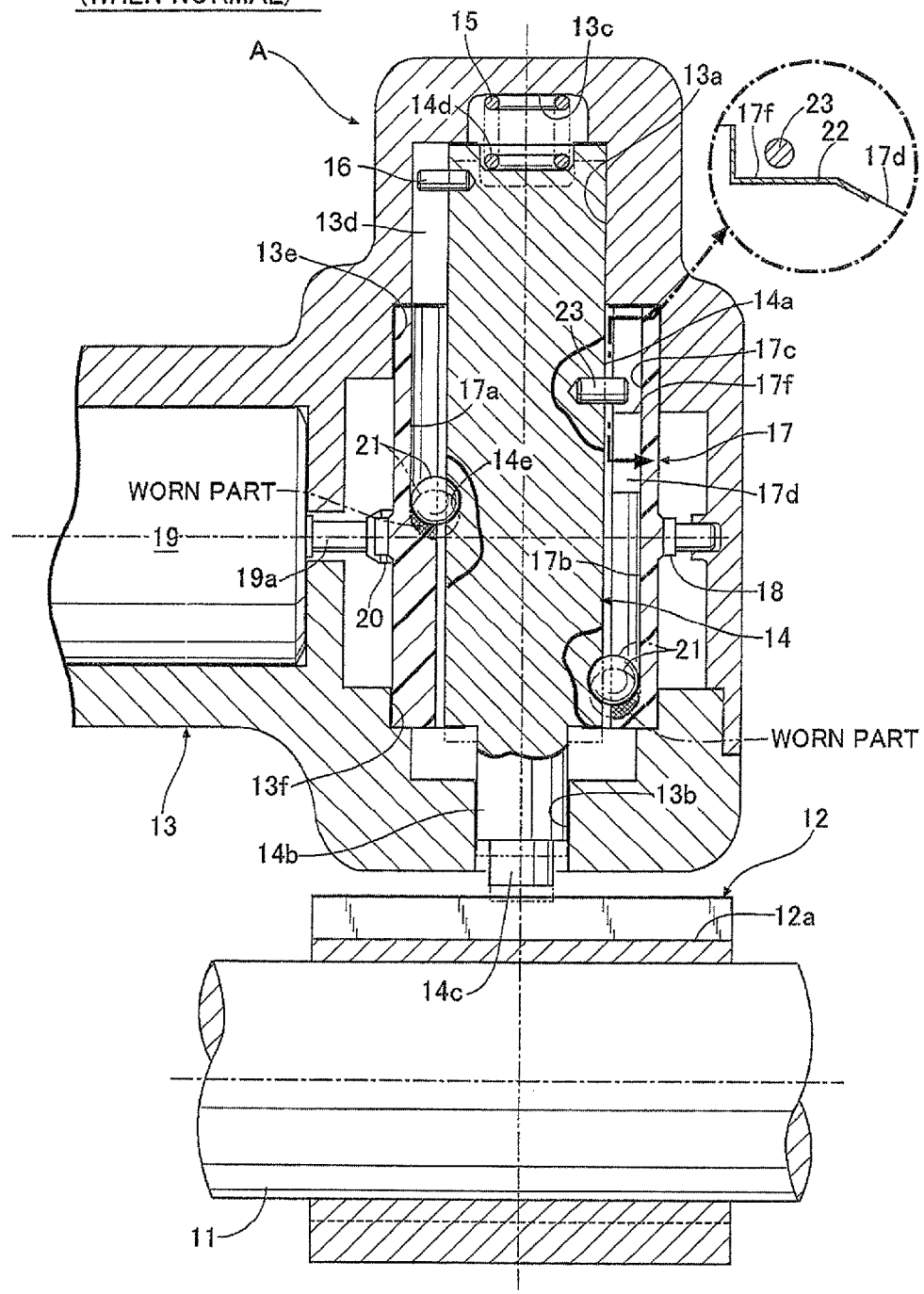
FIG. 6 is a view, corresponding to FIG. 1, for explaining the operation (unlocked state when normal). (first embodiment)

As shown in FIG. 6, when the electric motor 19 is driven in a lock release direction from the above locked state, the tubular member 17 is rotated via the worm 20 and the worm wheel 18, and the balls 21 and 21, which are engaged with the ball retaining grooves 17a and 17b formed in the inner peripheral face of the tubular member 17, also rotate integrally therewith. In this process, the detent pin 16 provided on the lock pin 14 engages with the detent groove 13d, thus restraining rotation of the lock pin 14 but permitting movement in the axial direction, the lock pin 14 whose cam groove 14e is pushed up by the balls 21 and 21 rotating integrally with the ball retaining grooves 17a and 17b therefore rises while compressing the coil spring 15, and the engagement portion 14c thereof is disengaged from the recess 12a of the steering shaft 11, thereby unlocking the steering wheel so that it can rotate.

Conversely, when the electric motor 19 is driven in a lock direction from the unlocked state shown in FIG. 6, as shown in FIG. 1 the tubular member 17 is rotated via the worm 20 and the worm wheel 18, and due to the balls 21 and 21 engaging with the cam groove 14e, the lock pin 14 is driven downward, this being assisted by the resilient force of the coil spring 15, thereby engaging the engagement portion 14c of the lock pin 14 with the recess 12a and locking the steering wheel so that it cannot rotate.

In the process of the lock pin 14 moving upward and downward, the tubular member 17 rotates relative to the guide pin 23 implanted in the lock pin 14, but as shown in FIG. 8 (A), when normal, the guide pin 23 does not abut against the cam face 17d at the lower edge of the recess 17c formed on the tubular member 17. Furthermore, when the tubular member 17 rotates, the balls 21 and 21 also move above and below the plane of the paper, but in FIG. 6 and FIG. 7 the balls 21 and 21 are drawn at positions in the plane of the paper for convenience.

Figure 7:
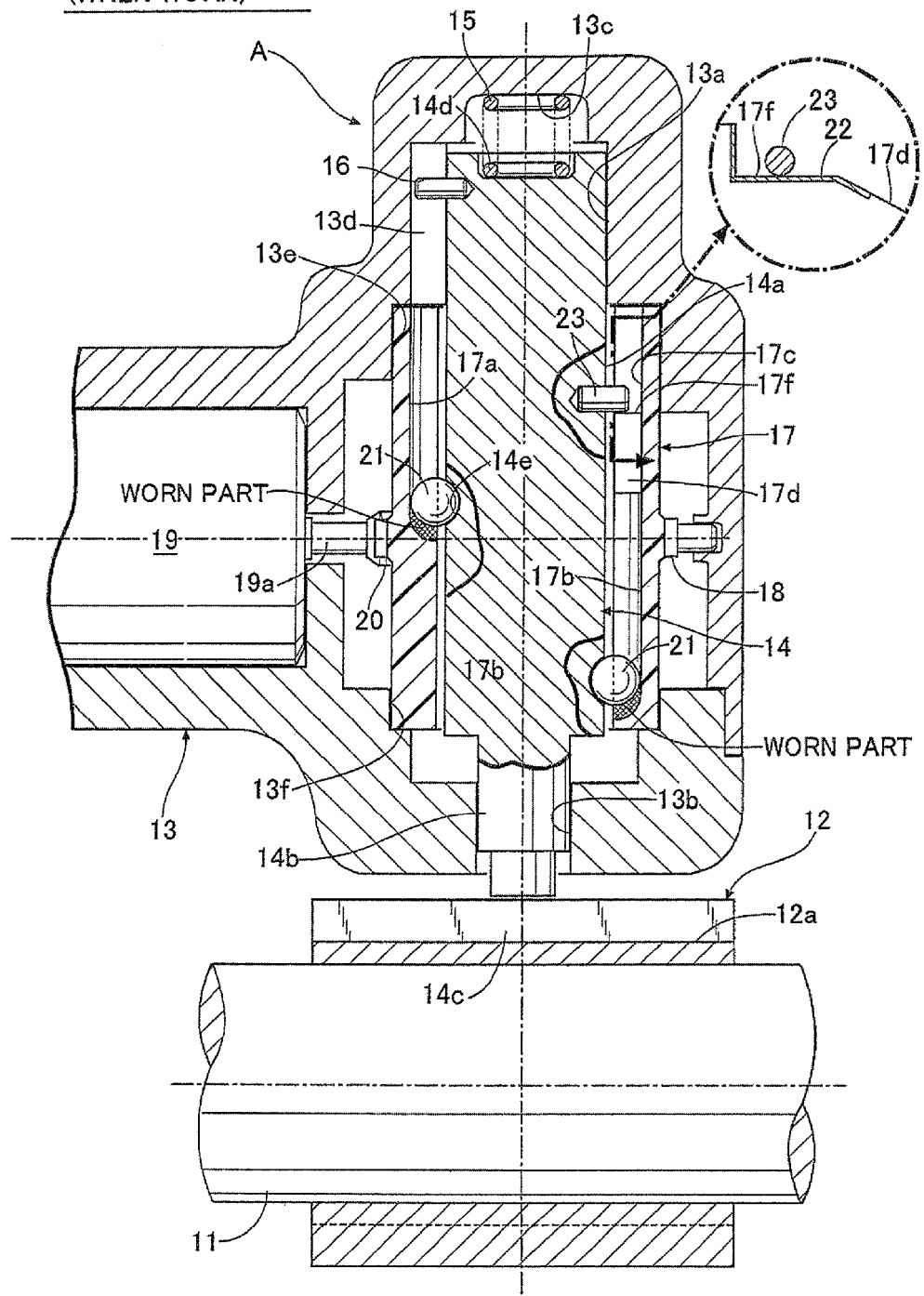
FIG. 7 is a view, corresponding to FIG. 1, for explaining the operation (unlocked state when worn). (first embodiment)

When the engagement portion 14c of the lock pin 14 has been engaged with the recess 12a of the steering shaft 11 to attain a locked state in a state in which the steering wheel is turned to a limit, if the tubular member 17 is rotated in order to obtain an unlocked state, since a large load is required for pulling up the lock pin 14, the balls 21 and 21 are pressed strongly against the bottom parts of the ball retaining grooves 17a and 17b and the bottom parts gradually wear (see hatched parts in FIG. 6 and FIG. 7). If the bottom parts of the ball retaining grooves 17a and 17b are worn in this way, since the balls 21 and 21 are pressed against the worn bottom parts of the ball retaining grooves 17a and 17b by virtue of the resilient force of the coil spring 15, as shown by a chain line in FIG. 6, even if an attempt is made to pull up the lock pin 14 by the tubular member 17 rotating by a predetermined amount, due to the decrease, corresponding to the amount of wear, in the amount by which the lock pin 14 is pulled up, the lower end of the engagement portion 14c of the lock pin 14 catches the recess 12a of the steering shaft 11, and there is the problem that releasing the lock becomes impossible.

However, in accordance with the present embodiment, when the bottom parts of the ball retaining grooves 17a and 17b are worn and the position of the lock pin 14 becomes lower than when normal, in the process of pulling up the lock pin 14 by the cam groove 14e and the balls 21 and 21 in order to release the lock, as shown in FIG. 7 and FIG. 8 (B) the guide pin 23 provided on the lock pin 14 abuts against the cam face 17d formed on the inner face of the tubular member 17, the lock pin 14 is pulled up along the cam face 17d together with the guide pin 23, and it is therefore possible to release the lock by disengaging the engagement portion 14c of the lock pin 14 from the recess 12a of the steering shaft 11.

In this way, since, even if the bottom parts of the ball retaining grooves 17a and 17b are worn, releasing the lock can be carried out by the cam face 17d and the guide pin 23, it becomes unnecessary to set the stroke of the cam groove 14e larger than necessary, thus contributing to a reduction in the size of the actuator A. Moreover, since the metal liner 22 is embedded in the cam face 17d and the flat face 17f against which the guide pin 23 abuts, wear of the portions can be suppressed.

Furthermore, since the cam groove 14e guiding the balls 21 and 21 is provided on the lock pin 14 side and the cam face 17d guiding the guide pin 23 is provided on the tubular member 17 side, compared with a case in which both the cam groove 14e and the cam face 17d are provided on the lock pin 14 side or the guide pin 23 side, it is possible to achieve a reduction in the size of the actuator A.

The cam face 17d and the guide pin 23 do not make contact with each other unless the bottom parts of the ball retaining grooves 17a and 17b are worn, and even if the bottom parts of the ball retaining grooves 17a and 17b are worn, since they make contact only in the final stage in which the engagement portion 14c of the lock pin 14 is pulled out from the recess 12a of the steering shaft 11, it is possible to minimize the load on the electric motor 19 caused by a frictional force acting on the contacted parts.

A mode for carrying out the present invention is explained above, but the present invention may be modified in a variety of ways as long as the modifications do not depart from the spirit and scope thereof.

For example, in the embodiment the cam means (cam groove 14e) is provided on the lock pin 14 side, and the auxiliary cam means (cam face 17d) is provided on the tubular member 17 side, but the positional relationship may be reversed.

Furthermore, in the embodiment the number of balls 21 and 21 is two, but it may be one or three or more.

Moreover, the cam face 17d and the guide pin 23 may be made to operate immediately after the engagement portion 14c of the lock pin 14 is pulled out from the recess 12a of the steering shaft 11, and by so doing the load on the electric motor 19 caused by a frictional force acting on the contacted parts of the cam face 17d and the guide pin 23 can be further reduced.

The invention claimed is:

1. A steering lock device that non-rotatably locks a steering shaft by engaging an extremity of a lock pin with a recess formed in an outer periphery of the steering shaft, the lock pin being moved back and forth by an actuator,
   the actuator comprising an electric motor, a tubular member that encompasses an outer periphery of the lock pin and is rotated by the electric motor, and cam means that is provided on one of an inner peripheral face of the tubular member and an outer peripheral face of the lock pin, and converts rotation of the tubular member into back and forth movement of the lock pin in an axial direction of the lock pin,
   wherein auxiliary cam means is provided on the other of the inner peripheral face of the tubular member and the outer peripheral face of the lock pin, the auxiliary cam means converting rotation of the tubular member into movement in a direction that pulls out the lock pin from the recess,
   wherein said cam means and said auxiliary cam means are configured to be overlapped with each other as viewed in a direction perpendicular to the axial direction of the lock pin,
   wherein said cam means comprises a helical groove formed in said one of the inner peripheral face of the tubular member and the outer peripheral face of the lock pin and a ball held between the inner peripheral face of the tubular member and the outer peripheral face of the lock pin is engaged in the groove;
   wherein said auxiliary cam means comprises a cam face provided on the other of the inner peripheral face of the tubular member and the outer peripheral face of the lock pin so as to face in a direction opposite a direction in which the lock pin comes into engagement with the recess and a guide pin is provided on the one of the inner peripheral face of the tubular member and the outer peripheral face of the lock pin, the guide pin being capable of abutting against the cam face; and
   wherein said helical groove and said cam face are formed separate from each other.

2. The steering lock device according to claim 1, wherein the auxiliary cam means operates after the lock pin is pulled out from the recess by the cam means.

3. A steering lock device that non-rotatably locks a steering shaft by engaging an extremity of a lock pin with a recess formed in an outer periphery of the steering shaft, the lock pin being moved back and forth by an actuator,
   the actuator comprising an electric motor, a rotating member that encompasses an outer periphery of the lock pin and is rotated by the electric motor, and cam means that converts rotation of the rotating member into back and forth movement of the lock pin in an axial direction of the lock pin,
   wherein the steering lock device further comprises auxiliary cam means that, only when the stroke of the lock pin due to the cam means is insufficient to disengage the extremity of the lock pin from the recess, converts rotation of the rotating member into movement of the lock pin in the axial direction to increase the stroke of the lock pin, and
   wherein said cam means and said auxiliary cam means are configured to be overlapped with each other as viewed in a direction perpendicular to the axial direction of the lock pin.

4. The steering lock device according to claim 3, wherein the rotating member is formed into a tubular shape, the cam means is provided on one of an inner peripheral face of the rotating member and an outer peripheral face of the lock pin, and the auxiliary cam means is provided on the other of the inner peripheral face of the rotating member and the outer peripheral face of the lock pin.

5. The steering lock device according to claim 4, wherein the auxiliary cam means operates after the lock pin is pulled out from the recess by the cam means.

6. The steering lock device according to claim 4, wherein said cam means comprises a helical groove formed in said one of the inner peripheral face of the tubular member and the outer peripheral face of the lock pin and a ball held between the inner peripheral face of the tubular member and the outer peripheral face of the lock pin is engaged in the groove;
   said auxiliary cam means comprises a cam face provided on the other of the inner peripheral face of the tubular member and the outer peripheral face of the lock pin so as to face in a direction opposite a direction in which the lock pin comes into engagement with the recess and a guide pin is provided on the one of the inner peripheral face of the tubular member and the outer peripheral face of the lock pin, the guide pin being capable of abutting against the cam face; and
   said helical groove and said cam face are formed separate from each other.

7. The steering lock device according to claim 3, wherein the auxiliary cam means operates after the lock pin is pulled out from the recess by the cam means.

8. A steering lock device that non-rotatably locks a steering shaft by engaging an extremity of a lock pin with a recess formed in an outer periphery of the steering shaft, the lock pin being moved back and forth by an actuator,
   the actuator comprising an electric motor, a tubular member that encompasses an outer periphery of the lock pin and is rotated by the electric motor, and a cam provided on one of an inner peripheral face of the tubular member and an outer peripheral face of the lock pin and converts rotation of the tubular member into back and forth movement of the lock pin in an axial direction of the lock pin,
   wherein the steering lock device further comprises an auxiliary cam provided on the other of the inner peripheral face of the tubular member and the outer peripheral face of the lock pin, the auxiliary cam converting rotation of the tubular member into movement in a direction that pulls out the lock pin from the recess, wherein said cam and said auxiliary cam are configured to be overlapped with each other as viewed in a direction perpendicular to the axial direction of the lock pin, wherein said cam comprises a helical groove formed in said one of the inner peripheral face of the tubular member and the outer peripheral face of the lock pin and a ball held between the inner peripheral face of the tubular member and the outer peripheral face of the lock pin is engaged in the groove, wherein said auxiliary cam comprises a cam face provided on the other of the inner peripheral face of the tubular member and the outer peripheral face of the lock pin so as to face in a direction opposite a direction in which the lock pin comes into engagement with the recess and a guide pin is provided on the one of the inner peripheral face of the tubular member and the outer peripheral face of the lock pin, the guide pin being capable of abutting against the cam face, and wherein said helical groove and said cam face are formed separate from each other.

9. The steering lock device according to claim 8, wherein the auxiliary cam operates after the lock pin is pulled out from the recess by the cam.

10. A steering lock device that non-rotatably locks a steering shaft by engaging an extremity of a lock pin with a recess formed in an outer periphery of the steering shaft, the lock pin being moved back and forth by an actuator, the actuator comprising an electric motor, a rotating member that encompasses an outer periphery of the lock pin and is rotated by the electric motor, and a cam that converts rotation of the rotating member into back and forth movement of the lock pin in an axial direction of the lock pin, wherein the steering lock device further comprises an auxiliary cam that, only when the stroke of the lock pin due to the cam is insufficient to disengage the extremity of the lock pin from the recess, converts rotation of the rotating member into movement of the lock pin in the axial direction to increase the stroke of the lock pin, and wherein said cam and said auxiliary cam are configured to be overlapped with each other as viewed in a direction perpendicular to the axial direction of the lock pin.

11. The steering lock device according to claim 10, wherein the rotating member is formed into a tubular shape, the cam is provided on one of an inner peripheral face of the rotating member and an outer peripheral face of the lock pin, and the auxiliary cam is provided on the other of the inner peripheral face of the rotating member and the outer peripheral face of the lock pin.

12. The steering lock device according to claim 11, wherein the auxiliary cam operates after the lock pin is pulled out from the recess by the cam.

13. The steering lock device according to claim 10, wherein the auxiliary cam operates after the lock pin is pulled out from the recess by the cam.

14. The steering lock device according to claim 10, wherein said cam comprises a helical groove formed in said one of the inner peripheral face of the tubular member and the outer peripheral face of the lock pin and a ball held between the inner peripheral face of the tubular member and the outer peripheral face of the lock pin is engaged in the groove;

said auxiliary cam comprises a cam face provided on the other of the inner peripheral face of the tubular member and the outer peripheral face of the lock pin so as to face in a direction opposite a direction in which the lock pin comes into engagement with the recess and a guide pin is provided on the one of the inner peripheral face of the tubular member and the outer peripheral face of the lock pin, the guide pin being capable of abutting against the cam face; and said helical groove and said cam face are formed separate from each other.

* * * * *